United States Patent [19]
Zhang

[11] Patent Number: 5,492,205
[45] Date of Patent: Feb. 20, 1996

[54] HIGH COOLING AIR FLOW RATE BRAKE ROTOR

[75] Inventor: Jian J. Zhang, Troy, Mich.

[73] Assignee: General Motors Corporation, Detroit, Mich.

[21] Appl. No.: 297,276

[22] Filed: Aug. 29, 1994

[51] Int. Cl.⁶ .................. F16D 65/12; F16D 65/847
[52] U.S. Cl. ............... 188/218 XL; 188/764 AA
[58] Field of Search .......... 188/218 R, 218 XC, 188/264 R, 264 A, 264 AA

[56] References Cited

U.S. PATENT DOCUMENTS

| | | | |
|---|---|---|---|
| 3,043,630 | 7/1962 | Heitzman | 301/6 |
| 3,933,228 | 1/1976 | Otto et al. | 188/218 XL |
| 3,955,650 | 5/1976 | Ellis | 188/71.1 |
| 4,083,435 | 4/1978 | Gallus et al. | 188/218 XL |
| 4,164,993 | 8/1979 | Kobelt | 188/218 XL |
| 4,488,074 | 12/1984 | Marandet | 188/218 XL |
| 4,523,666 | 6/1985 | Murray | 188/218 XL |
| 4,638,891 | 1/1987 | Wirth | 188/218 XL |
| 4,811,822 | 3/1989 | Estaque | 188/264 A |
| 4,825,981 | 5/1989 | Otto et al. | 188/218 XL |
| 4,865,167 | 9/1989 | Giorgetti et al. | 188/218 XL |
| 5,107,966 | 4/1992 | Metzler et al. | 188/218 XL |
| 5,139,117 | 8/1992 | Melinat | 188/218 XL |
| 5,161,652 | 11/1992 | Suzuki | 188/218 XL |

*Primary Examiner*—David M. Mitchell
*Assistant Examiner*—Alfred Muratori
*Attorney, Agent, or Firm*—Jeffrey A. Sedlar

[57] ABSTRACT

A brake rotor exhibits improved air flow cooling characteristics and includes an optimum number of vanes, a passage profile designed to reduce flow restrictions and an alternate longer-shorter vane configuration to accommodate the rotor air flow regime.

5 Claims, 1 Drawing Sheet

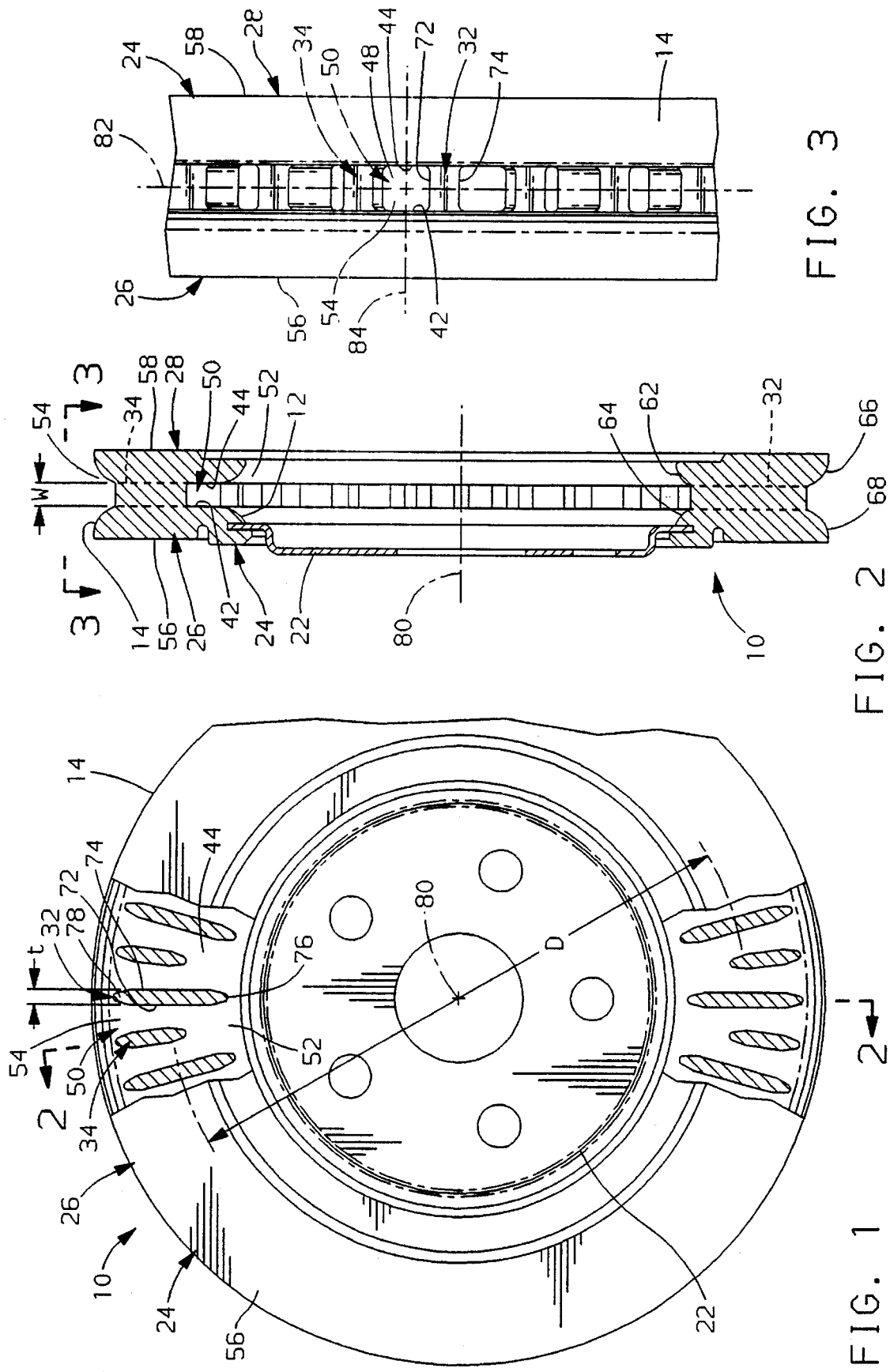

HIGH COOLING AIR FLOW RATE BRAKE ROTOR

BACKGROUND OF THE INVENTION

This invention relates to brake rotors as used in a disk brake systems. More particularly, the invention relates to a brake rotor which incorporates a plurality of cooling vanes within the rotor for air cooling purposes.

Conventional brake rotors generally include a pair of mutually spaced-apart annular disks which present two opposed external surfaces for the application of a braking actuator. The space between the disks typically includes a number of vanes with flow passages that extend between the disks from their inner diameter to their outer diameter disposed between each pair of adjacent vanes. Rotation of the rotor causes the vanes to induce air flow through the flow passages from the inner diameter to the outer diameter of the disks providing increased heat transfer from the rotor.

Brake rotor design plays an important role in brake cooling. A brake rotor is generally designed for use within a particular application where surrounding structures impact the rotor's size. Constraints exist on the outer and inner diameters of the rotor's air flow area and on the total rotor thickness between braking surfaces. Additionally, manufacturing requirements limit the amount that the cross sectional area of the rotor structure can vary. Therefore, the convective heat transfer surface area of the rotor is limited by design constraints imposed by the application into which the rotor is integrated.

The vent section of the rotor however, does allow for design flexibility. The vent section, particularly the vane surface, affects the heat transfer rate. Proper design of the vent section can have a favorable impact on the rotor's overall cooling performance.

In order to brake a travelling vehicle to a slower speed or to a stop, a large amount of energy must be dissipated. A significant amount of this energy is converted into heat which tends to significantly raise the temperature of the rotor. In order to prevent brake overheating and reduce brake wear, which increases with higher temperatures, an adequate provision must be made for transferring away the heat load generated in the rotors. In order to provide an improved air flow rate for improved brake rotor cooling, a brake rotor with an optimized vane number and configuration is sought which provides a low restriction air flow passage and whose configuration is adapted to increasing the rotor cooling air flow rate. Further, it is important that a brake rotor of such a design does not add complexity to the manufacturing of the rotor or its assembly into a vehicle.

SUMMARY OF THE INVENTION

The present invention provides a brake rotor having improved cooling characteristics. The rotor is arrived at through: (1) arriving at a vane configuration which accommodates the rotor's air flow regime; (2) establishing a formula based on fluid mechanics principles to calculate the optimal vane number for a given rotor design which results in high flow efficiency; and (3) providing a flow passage profile design that results in reduced flow restriction and improved cooling air flow.

A rotor according to these parameters includes two spaced apart annular disks each having an inner diameter and an outer diameter. A plurality of radially disposed vanes extend between the two spaced apart disks. The profile of each vane is generally straight. The vanes are provided in an alternate longer-shorter configuration.

To effectively guide flow and also avoid high blockage of the flow passage the alternate longer-shorter vane configuration is preferred for the straight vane profile. The effect is that when flow is near the inner diameter of the disks the number of vanes is small and therefore, flow blockage is small which allows air flow to easily pass into the flow passages. When flow arrives at approximately the rotor's mid-diameter between the disk's inner diameter and outer diameter, the number of vanes is increased to better guide flow through the increased available flow passage area towards the outlet.

Due to the small number of vanes adjacent the inner diameter at the rotor inlet, a low flow blockage is exhibited and hence, the entering air easily moves through the flow passage inlet. Recirculation zones before and after the passage inlet are minimized.

Another factor having a favorable impact on the flow characteristics of the rotor is that the inboard and outboard shoulders, which help define the flow passage, have smooth curved surfaces that lead into and leave the flow passage. Flow characteristics are also optimized by smoothly tapered surfaces on the inlet and outlet ends of the vanes.

A major design parameter of the rotor is the number of vanes included. The viscous effect is dominant for the rotor's flow field, where the air velocity is relatively low. Therefore, achieving the least viscous friction loss is a decisive factor in selecting the proper number of vanes to optimize cooling. For a given area it is known that a square has the least perimeter as compared to all other rectangular shapes. Thus, it will result in the least friction loss. The present invention applies this principle at the mid-diameter of the rotor to determine the number of vanes for the rotor. The mathematical expression used to determine the vane number is $N = \pi D / w + t$, where N is the number of vanes, D is the mid-diameter of the rotor, w is the flow passage width between rotor disks and t is the vane thickness between flow passages.

For a given rotor design in a particular application, D, w and t are established design parameters. Therefore, by using the above equation the optimal number of vanes for a given rotor is established.

Use of the aforementioned method of selecting the number of vanes for a given rotor results in a specific flow passage cross sectional characteristic at the mid-diameter of the rotor. This characteristic is that the flow passage cross section taken transverse to the general flow direction at the mid-diameter exhibits substantially equal dimensions across the flow passage, along axes crossing the center point of the flow passage, parallel to the planes defined by the braking surfaces and parallel to the rotor's axis of rotation.

BRIEF DESCRIPTION OF THE DRAWINGS

FIG. 1 is a fragmentary partial sectional view of a brake rotor.

FIG. 2 is a cross-sectional view taken generally through the plane indicated by the line 2—2 on FIG. 1.

FIG. 3 is an end view of the flow passages through the rotor viewed from the outlet end.

DETAILED DESCRIPTION OF THE PRESENTLY PREFERRED EMBODIMENT

Referring to the drawings, FIGS. 1 and 2 illustrate a brake rotor according to the present invention. The brake rotor 10 includes a center hub portion 22 for mounting to a rotatable hub of a vehicle (not illustrated) about an axis of rotation 80 and brake band portion 24 which serves as the point of application for the braking force of the vehicle. The brake band portion 24 includes two generally parallel planar braking surfaces 56 and 58.

Brake rotor 10 is constructed by conventionally forming center hub portion 22 from steel of approximately 2.6 millimeters thickness. Brake band portion 24 is conventionally formed from iron cast onto formed center hub portion 22 so that the two are bonded together. Optionally, rotor 10 may be formed from a one-piece casting of iron, aluminum or other suitable metal as conventional in the art.

Brake band portion 24 includes outboard disk 26 which exhibits braking surface 56 and inboard disk 28 which exhibits braking surface 58. Outboard disk 26 and inboard disk 28 are arranged in a mutually spaced apart configuration and each disk is annular shaped having an inner diameter formed by inner disk perimeter 12 and an outer diameter formed by outer disk perimeter 14.

Brake band portion 24 includes forty-eight radially disposed vanes which extend between the inboard surface 42 of outboard disk 26 and the outboard surface 44 of inboard disk 28. The inboard surface 42 and the outboard surface 44 are disposed on the interior of the brake band portion 24 and face each other to define a number of flow passages represented by flow passage 50 therebetween.

In a given application, the inner diameter at perimeter 12, the outer diameter at perimeter 14, the flow passage width w between surfaces 42 and 44 and the vane thickness t between sides 72 and 74 are established design criteria. Generally, these dimensions cannot be changed in developing the flow regime for the rotor 10 because they are set by external design factors.

Therefore, the heart of the rotor configuration design available to optimize air flow characteristics is the vane profile design. There are two general types of vane profiles, straight vanes and curved vanes. Both curved and straight vane profiles can be designed for an application by using flow analysis techniques. However, manufacturing and assembly requirements enter into the design of the rotor making it generally preferential to select the straight vane profile. The embodiment illustrated utilizes the straight vane profile design.

For the present embodiment, the design requirement of the ratio of the outer diameter at perimeter 14 to the inner diameter at perimeter 12 is 1.7. This illustrates that the flow area changes considerably from the inlet 52 to the outlet 54 of flow passage 50. To effectively guide flow through the rotor 10 and to avoid high blockage of the flow passage inlet 52, a longer vane 32 and shorter vane 34 alternate vane configuration is provided for the straight vane profile. The purpose of this design is that when flow is near the inner diameter at perimeter 12 the number of vanes is relatively small. Therefore, flow blockage is minimized and air flow is allowed to pass readily through inlet 52 into flow passage 50. When flow arrives at the mid-diameter D, the number of vanes is increased to better guide flow through the otherwise increasing area towards the outlet 54.

A major design parameter of the rotor 10 is the number of vanes inside the brake band portion 24. According to this invention, an analysis to determine the optimum number of vanes for a high efficiency rotor is conducted based on fluid mechanics principles. One such principle is that the fluid flow viscous effect, which is associated with friction losses, is dominant for a rotor flow field such as the present where air velocity is relatively low. Therefore, achieving the least viscous friction loss is a decisive factor in selecting the number of vanes.

A significant contributor to a flow passage's friction loss is the amount of surface area that the flowing fluid contacts. It is well known that for a given area a square has the least perimeter as compared to all other rectangular shapes. Thus, it will result in the least viscous friction loss. This principle is applied at the mid-diameter D of the rotor 10 to determine the optimum number of vanes for rotor 10. The mathematical expression used to determine the number of vanes is $N=\pi D/w+t$ where N is the number of vanes, D is the mid-diameter of the rotor, w is the flow passage width and t is the vane thickness.

Substituting the known design parameters D, w and t into the equation above results in the vane number of forty-nine for this embodiment. Due to the alternate longer-shorter configuration, an even number of vanes must be selected. Therefore, rounding off of the calculated optimum number must be conducted to select a suitable even number of vanes. In this embodiment the number of vanes is rounded to forty-eight rather than fifty to avoid reducing the vane thickness t below its minimum dimension parameter design requirements.

After determining the rotor configuration and the number of vanes included in the rotor, optimum flow passages are designed. The area adjacent the inner diameter at perimeter 12, around the flow passage inlet 52, has only the longer vanes 32 disposed therein. This results in a relatively small number of vanes in this area and the flow blockage is accordingly, small. Therefore, the entering air flows into the flow passage 50 more readily. Recirculation zones before and after the passage inlet 52 are minimized, which results in improved air flow and higher heat transfer rates from the rotor 10.

A factor which favorably impacts on the flow field is that the inboard and outboard shoulders 62 and 64 respectively, exhibit smooth curved surfaces which lead to flow passage 50 and inboard and outboard shoulders 66 and 68 respectively, exhibit smooth curved surfaces which leave flow passage 50.

An additional factor which impacts on the optimal flow condition provided, is the vane tip design. The inlet end vane tip 76 and outlet end vane tip 78 exhibit a smoothly curved tapered surface which improves the air flow performance. The tips 76 and 78 contribute to a smooth flow through the flow passages of rotor 10 near the vane tips.

Referring to FIG. 3, illustrated is a view of the outlets of the rotor 10 represented by outlet 54 of the flow passages represented by flow passage 50. As can be seen, flow passage 50 is restricted to a generally square-like configuration 48 near the mid-diameter D of rotor 10. The dimensions of the flow passage 50, at the mid-diameter D, along the axis 82, which is parallel to the planes defined by braking surfaces 56 and 58 and along the axis 84, which is parallel to the axis of rotation 80 of rotor 10, are substantially equal. Slight differences can exist due to rounding off that occurs in selecting an even whole number of vanes adjacent to the calculated optimum number.

What is claimed is:

1. A brake rotor comprising:
   two spaced apart annular disks having an inner diameter and an outer diameter;
   a number of radially disposed vanes extending between the two spaced apart disks of alternate longer and shorter configuration defining a number of flow passages having mid-points with a substantially square cross section with two pair of spaced apart opposing walls formed by the disks and the vanes each pair of opposing walls having a spaced apart distance that is substantially equal near the flow passage's mid-point, wherein each flow passage is characterized by an inlet and an outlet having a structure defined by smoothly long-radius curved shoulders on the inboard and outboard disks and smoothly curved tapered tips on the inlet and outlet ends of the vanes to facilitate flow through the flow passages.

2. A brake rotor according to claim 1 wherein the number of radially disposed vanes is defined by the equation $\pi D/w+t$ wherein D is a mid-diameter of the brake rotor midway between the inner diameter and the outer diameter, w is the width of one of the flow passages from one disk to the other and t is the thickness of one of the vanes.

3. A brake rotor comprising:

two disks being annular and spaced apart having an inner diameter and an outer diameter and wherein D is a diameter midway between the inner diameter and the outer diameter and each of the two disks having an inner surface wherein w is a flow passage width from one inner surface to the other of the two disks; and a number of radially disposed vanes each having a thickness t and extending between the two disks of alternate longer and shorter configuration wherein the number of radially disposed vanes is defined by the equation $\pi D/w+t$.

4. A brake rotor comprising:

two spaced apart annular disks having an inner diameter and an outer diameter;

a plurality of radially disposed straight vanes extending between the two spaced apart annular disks of alternate longer and shorter configuration the two spaced part annular disks and the plurality of radially disposed straight vanes, in combination, forming a plurality of flow passages, each flow passage having an inlet with a shoulder near the inner diameter formed by each of the two spaced apart disks of smoothly curving profile leading to a flow passage segment defined between two of the longer radially disposed straight vanes which leads to a diverging pair of flow paths of substantially square-like cross section each of the diverging pair of flow paths defined between one of the two longer radially disposed straight vanes and an interposed shorter radially disposed straight vane each of the diverging pair of flow paths having an outlet with a shoulder near the outer diameter formed by each of the two spaced apart disks of smoothly curving profile wherein the number of radially disposed straight vanes is defined by the equation $\pi D/w+t$ wherein D is a mid-diameter of the brake rotor, w is the width of a flow passage from one disk to the other and t is the thickness of a vane.

5. A method of manufacturing a brake rotor having a cast brake band portion with a pair of mutually spaced apart opposed annular disks having inner diameters and outer diameters with shoulders, a mid-diameter D, a flow passage with a width w from one disk to the other and a number of vanes N, each vane with a thickness t, where $N=\pi D/w+t$, and each vane with an inlet end tip and an outlet end tip positioned between the annular disks and a number of flow passages with inlets and outlets, each flow passage being defined between a pair of adjacent vanes and the two annular disks, comprising the steps of:

a. selecting an alternating shorter vane and longer vane configuration, wherein each pair of adjacent vanes includes one longer vane and one shorter vane;

b. determining the value of D, w and t;

c. calculating the number of vanes according to the equation $N=D/w+t$;

d. rounding the number of vanes to an adjacent whole even number;

e. selecting the adjacent whole even number as the number of vanes;

f. designing the vanes with smooth curved surfaces and tapered profiles at the inlet end tips and outlet end tips to minimize recirculation zones before and after the flow passage inlets; and g. constructing a rotor having shoulders on the disks, adjacent the inlets and outlets of the flow passages which exhibit smooth curved surfaces to facilitate air flow through the flow passages.

* * * * *